(12) United States Patent
Geffen et al.

(10) Patent No.: US 11,403,579 B2
(45) Date of Patent: Aug. 2, 2022

(54) SYSTEMS AND METHODS FOR MEASURING THE EFFECTIVENESS OF AN AGENT COACHING PROGRAM

(71) Applicant: NICE Ltd., Ra'anana (IL)

(72) Inventors: David Geffen, Givat Shmuel (IL); Yuval Shachaf, Netanya (IL); Gennadi Lembersky, Haifa (IL)

(73) Assignee: NICE LTD., Ra'anana (IL)

( * ) Notice: Subject to any disclaimer, the term of this patent is extended or adjusted under 35 U.S.C. 154(b) by 0 days.

(21) Appl. No.: 16/830,806

(22) Filed: Mar. 26, 2020

(65) Prior Publication Data
US 2021/0304103 A1    Sep. 30, 2021

(51) Int. Cl.
*G06Q 10/06*    (2012.01)

(52) U.S. Cl.
CPC .............................. *G06Q 10/06393* (2013.01)

(58) Field of Classification Search
CPC ...................................................... G06Q 10/06
See application file for complete search history.

(56) References Cited

U.S. PATENT DOCUMENTS

| | | | |
|---|---|---|---|
| 10,482,781 B2 * | 11/2019 | Aleahmad | G09B 5/02 |
| 2006/0031041 A1 * | 2/2006 | Afshar | G06Q 10/06 |
| | | | 702/184 |
| 2008/0059292 A1 * | 3/2008 | Myers | G06Q 50/10 |
| | | | 705/7.39 |
| 2009/0197228 A1 * | 8/2009 | Afshar | G06Q 10/06 |
| | | | 434/219 |
| 2010/0062411 A1 * | 3/2010 | Bartholomew | G09B 7/00 |
| | | | 434/350 |
| 2014/0335497 A1 * | 11/2014 | Gal | G09B 5/08 |
| | | | 434/323 |
| 2018/0075766 A1 * | 3/2018 | Martin | H04L 12/185 |
| 2018/0158347 A1 * | 6/2018 | Sarafzade | H04W 4/02 |
| 2018/0286272 A1 * | 10/2018 | McDermott | G09B 5/02 |
| 2020/0051460 A1 * | 2/2020 | Bedor | G09B 5/065 |

* cited by examiner

*Primary Examiner* — Kurtis Gills
(74) *Attorney, Agent, or Firm* — Pearl Cohen Zedek Latzer Baratz LLP

(57) ABSTRACT

Systems and methods for measuring the effectiveness of an agent coaching program calculate a rate of change in a first Key Performance Indicator for a first agent in a first coaching program during a period of time; select a control group of agents in which agents in the control group of agents were not exposed to the first coaching program; calculate an average rate of change in the first Key Performance Indicator for the control group of agents during the period of time; and calculate a first coaching impact of the first coaching program on the first Key Performance Indicator for the first agent relative to the average rate of change in the first Key Performance Indicator for the control group of agents during the period of time.

14 Claims, 7 Drawing Sheets

SYSTEMS AND METHODS FOR MEASURING THE EFFECTIVENESS OF AN AGENT COACHING PROGRAM

FIELD OF THE INVENTION

The present invention relates generally to selecting a training program for a worker, e.g., an agent in a call-center. More specifically, the present invention relates systems and methods for measuring the effectiveness of an agent coaching program.

BACKGROUND

Workplaces such as contact centers may provide coaching or training programs to agents, workers or employees that do not meet their goals. Training programs may include one-on-one sessions, in which the supervisor or another professional teaches or provides training material to the worker. For example, in contact centers, a supervisor may provide the employee with a recording of one or more interactions, either of the agent or of other agents, and request the agent to listen and/or view the interactions in order to learn how to better perform in the future.

While this is the standard form of coaching agents in contact centers today, this method does not always provide good results. Some agents respond well to this method of coaching while others do not. There are additional ways to coach an agent such as: group coaching, e.g., teaching multiple agents in a single session managed by a supervisor or other professional, online learning, e.g., providing an agent with links to knowledge centers and materials on the internet or intranet, peer coaching e.g., studying with a colleague, trivia, e.g., questions for learning a subject, etc. Different agents may respond differently to each method. While some workers may benefit from online learning, others may gain more from group coaching. Even in the case of standard one-one-one coaching, different agents may respond differently to different coaching programs.

However, while organizations invest, on average, approximately $4 M annually in coaching for every 1000 agents, these organizations have no way to measure the impact of the coaching in terms of Return on Investment (ROI), and no way to monitor and improve the effectiveness of the coaching they provided. Current software solutions are unable to accurately measure the effectiveness of individual programs except as a general trend of a key performance indicator (KPI). What are needed, therefore, are systems and methods which enable organizations to define an effectiveness score for each program thus computing the effectiveness of programs per KPI per agent, and enabling standardizing the expected effectiveness of programs for each KPI, thus driving continuous improvement.

SUMMARY

Embodiments of the invention provide methods for measuring the effectiveness of an agent coaching program, which include calculating a rate of change in a first Key Performance Indicator for a first agent in a first coaching program during a period of time; selecting a control group of agents; in which agents in the control group of agents have not been exposed to the first coaching program; calculating an average rate of change in the first Key Performance Indicator for the control group of agents during the period of time; and calculating a first coaching impact of the first coaching program on the first Key Performance Indicator for the first agent relative to the average rate of change in the first Key Performance Indicator for the control group of agents during the period of time.

Some embodiments of the invention calculate a coaching effectiveness score, wherein the coaching effectiveness score reflects the first coaching impact of the first coaching program compared to the period of time. Some embodiments identify a set of boosting factors in which the set of boosting factors fit a learning curve with respect to a rate of change of a given agent's first Key Performance Indicator during the period of time, and boost the coaching effectiveness score based on a position of the first agent on the learning curve. Some embodiments of the invention normalize the coaching effectiveness score.

Some embodiments calculate the first impact is calculated by subtracting the average rate of change in the first Key Performance Indicator for the control group of agents during the period of time from the rate of change in the first Key Performance Indicator for the first agent during the period of time. In some embodiments, the coaching effectiveness score is calculated by dividing the first coaching impact by the period of time.

In some embodiments, boosting the coaching effectiveness score based on the position of the first agent on the learning curve further includes: multiplying the coaching effectiveness score by a boosting factor of the set of boosting factors that is commensurate with the position of the first agent on the learning curve.

In some embodiments, the period of time is the time invested in the first coaching program. Some embodiments of the invention select a control group of agents comprises: receive attribute information for the first agent and for each agent in a pool of agents; generate a respective vector representation for the first agent and for each agent in the pool of agents; and add to the control group of agents each agent whose vector has a distance that is below a predefined threshold distance from the vector of the first agent.

Systems according to embodiments of the above methods may be provided. These and other aspects, features and advantages will be understood with reference to the following description of certain embodiments of the invention.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
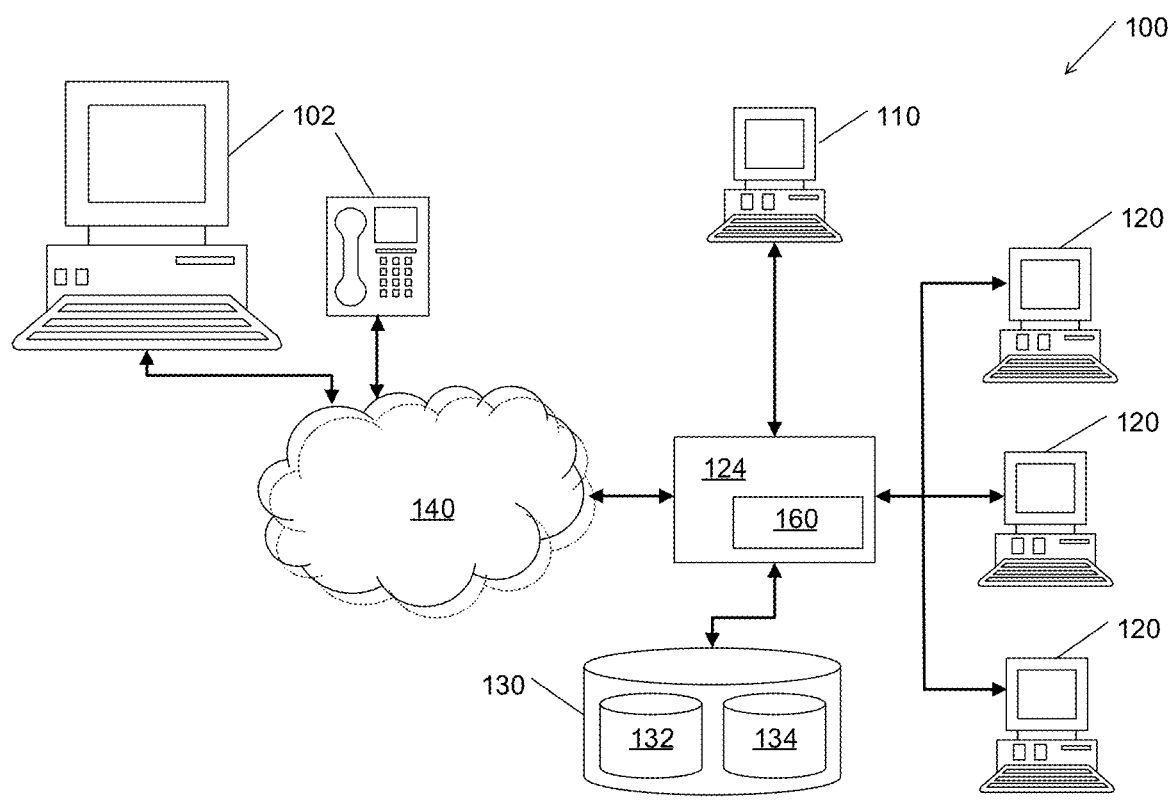
FIG. 1 schematically illustrates a system, according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to execute operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

Contact centers may include many agents or other people or personnel who participate in contacts with customers. A contact may be, for example, a conversation or interaction between an agent and a customer. Turnover in contact centers may be high, e.g., between 30-45 percent (e.g., 30-45% of agents change within one year), so there may be a constant flow of employees that need training, making providing the right training essential. While embodiments of the invention are described herein with relation to agents in a contact center, embodiments of the invention may be useful for computer systems in other organizations or environments where workers, agents, students, and/or other trainees require training (terms such as agents, workers or employees may be used interchangeably herein) and/or where coaching of large numbers of people may be beneficial. For example, embodiments of the system and method for measuring the effectiveness of an agent coaching program may be employed on a stock exchange floor, at a factory, or the like.

Furthermore, while one-on-one sessions may be a default form of coaching in many organizations, this method does not always provide good results. Some agents may respond well to this method of coaching while others may not. Therefore, organizations may develop various ways and/or programs to coach an agent such as: group coaching, e.g., teaching multiple agents in a single session managed by a supervisor or other professional, online learning, e.g., providing an agent with links to knowledge centers and materials on the internet or intranet, peer coaching e.g., studying with a colleague, trivia, e.g., questions for learning a subject, etc. Facing this variety of training programs, the organization needs to understand which training programs are providing agents with successful training and which are not. The cost of each training program may be different, and individual agents may respond differently to each training program. Thus, the supervisor may not know which training program may be the most efficient for a specific agent, both in terms of cost and in terms of improving performance. Thus, organizations may invest time and money in coaching but may not necessarily provide the right type of coaching to the right agent. This may waist money and have a negative effect on productivity and employee engagement.

Embodiments of the invention may provide computing systems selecting or aiding in the selection of a training program from a number of training programs for a selected worker. Organizations today broadly measure the effect of a training program on the performance of workers that participated in the training program. Currently, all available solutions measure the effectiveness of coaching based on charting trends of a key performance indicator (KPI) or other metric over time, tracking the coaching events on charts, etc. However, the individual effect of a single coaching program is not measured by any currently available systems.

Embodiments of the invention measure the effectiveness of each individual coaching program by considering the change in the KPI during the period of coaching as a function of the time invested. Based on this a metric for measuring coaching effectiveness may be created which can be measured, managed and improved. By measuring the effectiveness of individual programs, embodiments of the invention may recommend behaviors to focus on in order to optimize future coaching efforts.

Embodiments of the invention measure the coaching per program and cleanse the data from 'noise' by subtracting the average change of the KPI in all other agents (of the same persona or other equivalence) which were not exposed to the coaching program. This enables embodiments of the invention to create a coaching effectiveness score per KPI per agent, which can be benchmarked.

In particular, some embodiments of the invention measure the effectiveness of each individual coaching program by computing the change in KPI before and after the coaching session. In order to compute the effectiveness without taking external effects into the calculation, embodiments of the invention are configured to automatically remove or otherwise mitigate against any of those effects by subtracting the KPI change of a control group in the similar time range of test. The resulting output is the coaching program impact.

In some embodiments, this impact may then be divided by the time spent of the coaching program in order to provide the effectiveness score while taking into account the organization's return on investment (ROI); as the time spent of a program increases and effectiveness decreases, so does the ROI.

In some embodiments, as the individual trainee reaches to KPI maturity, as with any learning curve behavior (where the KPI reaches close to its cap, e.g. 100%), the effectiveness inherently decreases, subsequently causing phenomena in which the effectiveness of an experienced individual is low. In order to mitigate against this, in some embodiments, a normalization and/or boosting factor may be utilized. This is based on e.g., modeling a power law regression line corresponding to the learning curve of the agents in the test. Finally, in some embodiments, following the boosting factor the effectiveness scores may be normalized to a range, e.g., between 0 to 100, to allow a unified metric for benchmarks and comparisons.

Although described in the context of a contact center, the same or a similar system may be employed in other contexts where coaching of large numbers of people may be beneficial. For example, embodiments of the system and method for selecting a training program may be employed on a stock exchange floor, at a factory, or the like.

Reference will be made to the figures wherein like structures will be provided with like reference designations. The drawings are non-limiting, diagrammatic, and schematic representations of example embodiments, and are not necessarily drawn to scale.

Reference is made to FIG. 1, which schematically illustrates a system 100, according to embodiments of the invention. System 100 may include contact center 124 which may connect customer devices 102 to agent devices 120. Contact center 124 may also be connected to supervisor device 110. Contact center 124 may be or may include company call centers for telephone-based support, or online support forums for voice over internet protocol (VoIP) Internet-based support, for example, to provide customers with technical support, sell products, schedule appointments, or otherwise interact or communicate with customers. Organizations other than a contact center may use embodiments of the invention and/or other configurations as generally understood in the art. Contact center 124 may include a switching station to connect each of a plurality of user devices 102 to one of a plurality of agent devices 120 at the same time. Contact center 124 may include recommender engine 160 configured to select a training program from a plurality of training programs for a worker as disclosed herein and to provide a smart program effectiveness feature, as described herein, to implement various embodiments of the invention. Contact center 124 may be connected to one or more databases 130 for storing interactions or calls (e.g. conversations via telephone, VoIP, etc.) between users and agents via user devices 102 and agent's devices 120, and other data such as agents' attributes, performance improvement grades of workers, training programs, costs of training programs, and any other relevant data.

In some embodiments one or more databases 130 may include, for example a worker profile database or worker database 132 and a performance management database 134. Worker database 132 may store attributes of workers. The worker attributes may be used for, among other things, finding a group of similar workers given a specific worker to use as a control group (explained in detail herein). The attributes may include any characteristic of or describing the workers that may be used for categorizing or clustering workers and finding similar workers. The attributes may include for example, an agent's soft skills, relevant contact center statistics and an agent's attributes. For example, agent's soft skills may include ranks or grades for the agent's communication skills, problem solving, professionalism, creativity, etc., the agent attributes may include tenure, fields of expertise, languages, education, age, etc., and contact center statistics may include working shifts, average handle time, average call sentiment, transfer rate etc. Other attributes may be used.

Performance management database 134 may collect and/or store performance data of a term under investigation, e.g., a week, for specific agents. In various embodiments, the data collected may include: (1) coaching programs and their dates for each agent; (2) agent information such as skills, seniority, CRM related information, etc.; and (3) KPI performance history per time unit, e.g., per day, week, etc. In some embodiments, coaching programs data, agent information data, and/or KPI performance history data may be stored in the form of data structures or tables, examples of which are represented below in Table 1, Table 2, and Table 3, respectively.

TABLE 1

Coaching Programs Data:

| Field | Type |
| --- | --- |
| Program_ID | String |
| Agent_ID | String |
| Start_Time | DateTime |
| End_Time | DateTime |

TABLE 2

Agent Data:

| Field | Type |
| --- | --- |
| Agent_ID | String |
| Tenure_Group | Range |
| Skill1_LEVEL | Float |
| Skill2_LEVEL | Float |
| ... | |
| SkillN_LEVEL | Float |
| LEVEL1_MNGR | String |
| LEVEL2_MNGR | String |
| ... | |
| LEVELN_MNGR | String |

TABLE 3

KPI Performance History Data:

| Field | Type |
| --- | --- |
| TIMESTAMP | Date |
| Agent_ID | String |
| KPI_ID | String |
| KPI_VALUE | Int (range 0% . . . 100%) |

System 100 may be connected, or configured to be connected, to one or more user devices 102, such as, computers (for web or Internet voice connections), telephones (for telephone or radio network connections), for a customer to interact with and communicate with agents over one or more networks 140. Networks 140 may include any type of network or combination of networks available for supporting communication between user devices 102, supervisor device 110, contact center 124, agent devices 120 and databases 130. Networks 140 may include for example, wired and wireless telephone networks, the Internet and intranet networks, etc. Customers may use user devices 102 to connect to and communicate with live agents, for example, using or operating on agent devices 120 at contact center 124. System 100 may be connected, or configured to be connected, to one or more supervisor devices 102, such as, a computer for supervising agents.

Figure 7:
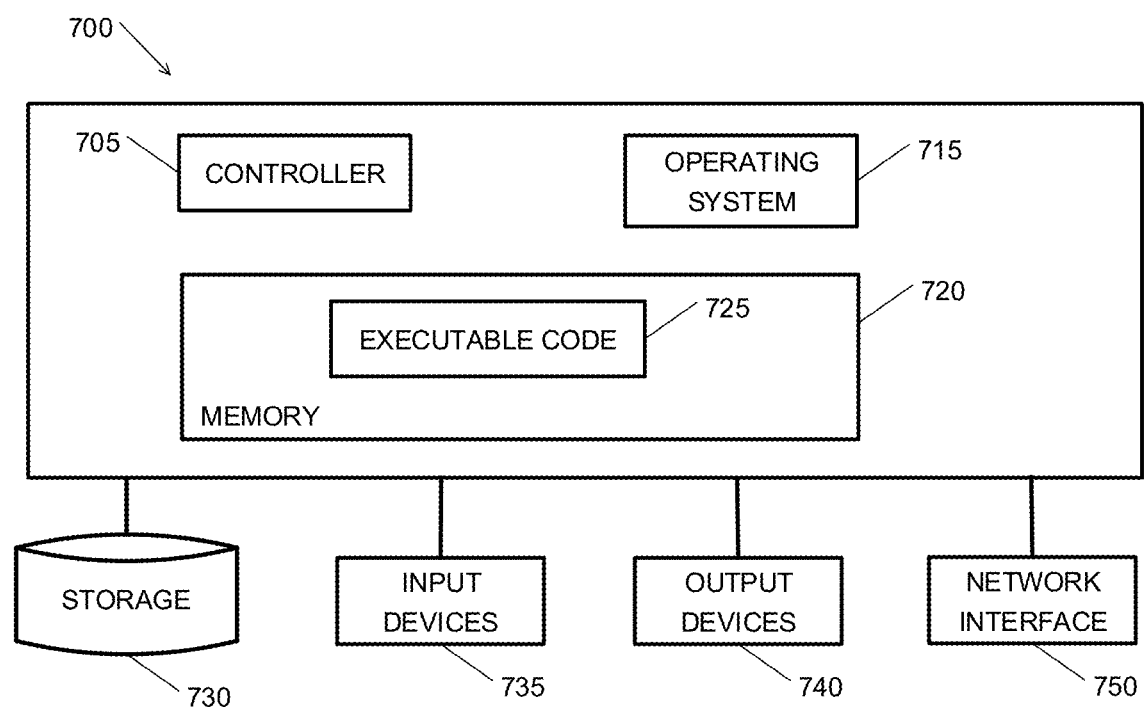
FIG. 7 illustrates an example computing device according to an embodiment of the invention.

Each of user devices 102, supervisor device 110, contact center 124 and agent devices 120 may be or may include a computing device such as computing device 700 depicted in FIG. 7, having one or more processors for executing one or more code sets to implement various aspects of the invention. One or more database 130 may be or may include a storage device such as storage device 730.

Recommender engine 160 may be configured to measure the effectiveness of each individual coaching program by considering the change in the KPI during the period of coaching as a function of the time invested. Based on this, a metric for measuring coaching effectiveness may be generated which can be measured, managed and improved. By measuring the effectiveness of programs, the Recommender engine may recommend behaviors to focus on in order to optimize future coaching efforts.

Figure 2:
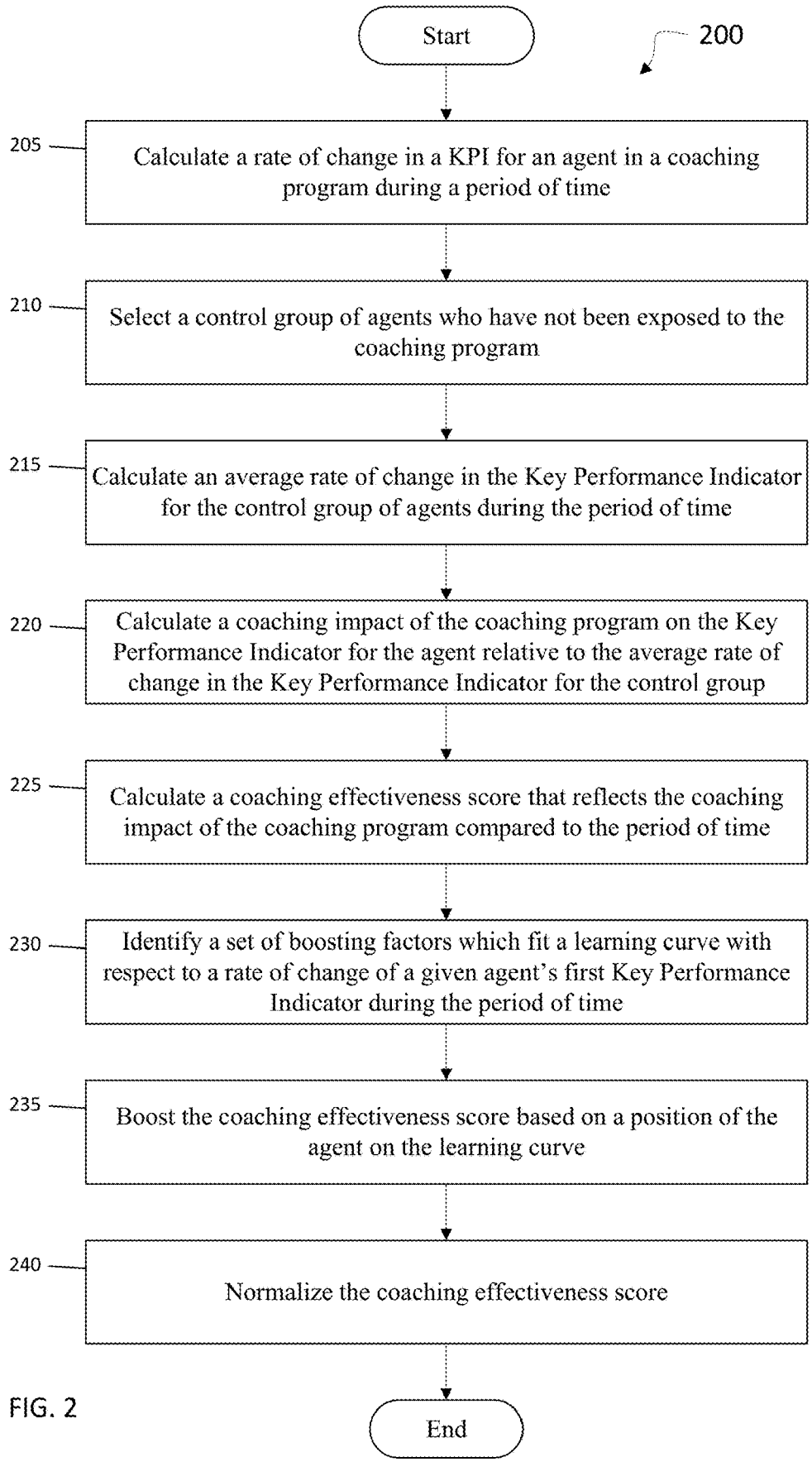
FIG. 2 is a flowchart of a method for measuring the effectiveness of an agent coaching program, according to embodiments of the invention.

Reference is made to FIG. 2, which is a flowchart of a method 200 for measuring the effectiveness of an agent coaching program, according to embodiments of the invention. An embodiment of a method for measuring the effectiveness of an agent coaching program may be performed, for example, by the systems shown in FIG. 1 and/or FIG. 7, but other hardware may be used. For example, method 200 may be performed on a computer (as described herein) having one or more processors, memory, and one or more codes set stored in the memory and executing in the processor, such as, recommender engine 160 and/or one or more other code modules, which, when executed, implement various embodiments of the invention as described herein.

Embodiments of the invention begin at step 205, when the processor calculates a rate of change in a first Key Performance Indicator (KPI) for a first agent in a first coaching program during a period of time. As understood herein, a period of time may refer to a total amount of time invested (e.g., by all parties) in a program, and may not be simply the time frame during which a program takes place. When the program began or ended is not paramount but rather the time invested in the activities. Furthermore, a period of time may consist of multiple smaller periods of time that collectively make up the period of time invested in the program (e.g., multiple hours, multiple days, etc.). The processor may receive as input a program identifier (Program_ID), an Agent identifier (Agent_ID), and a KPI identifier (KPI_ID), e.g., from the Performance Management database. In some embodiments, the processor may (1) extract the start time (start_time) and the end time (end_time) of the specific program to which the agent was exposed; (2) extract the value of the agent's KPI_ID for a predefined period of time (e.g., one day) before the program began (KPI_start), e.g., before the agent was exposed to the program; and (3) extract the value of the agent's KPI_ID for a predefined period of time (e.g., one day) after the program ended (KPI_end), e.g., after the agent completed or was otherwise exposed to the program; and (4) subtract the KPI_start from the KPI_end to calculate the rate of change in the KPI (KPI_change=KPI_end−KPI_start). In some embodiments, the output may be represented as KPI_change: float.

In some embodiments, at step 210, the processor may select a control group of agents who were not exposed to the coaching program (e.g., who have not gone through the coaching program), e.g., from a group or pool of agents. The processor may receive as input, information about a group of agents (e.g., Agent_ID information), as well as information about which programs those agents were exposed to (e.g., Program_ID). In some embodiments, the processor may retrieve one or more Agent_ID attributes (e.g., attributes about the first agent, as specified in the agent data—Table 2) and represent them as a vector, e.g., as follows: (a) For the tenure group of the first agent (tenure_group) the processor may add cells to a vector representing a number of different possible tenure_groups, in which the processor may specify a "1" digit in the cell corresponding to the agent tenure_ group value and "0" digit in all others. For example, if the first agent (i.e., Agent_ID) is in the tenure_group '>12 month', then the vector (vector<Agent_ID>) may be expressed as:

| >1 month | 1-2 months | 2-3 months | 3-5 months | 5-8 months | 8-12 months | >12 months |
|---|---|---|---|---|---|---|
| 0 | 0 | 0 | 0 | 0 | 0 | 1 |

(b) For each of the skill level attributes of the first agent, the processor may divide the skill level by the max skill level (e.g., 5). For example, if skill1_level=3 then the processor may be configured to add to the vector $3/5=0.6$. (c) For each of the supervisor attributes, the processor may add one cell to the vector with a value 1. Of course, in various embodiments, other vector representations may also be used to represent the first agent.

In some embodiments, once the vector has been generated for the first agent (Agent_ID), then for each agent other than the first agent (Agent_ID, the agent exposed to the coaching program), the processor may perform one or more of the following: (a) Extract the start_time and the end_time of the Program_ID for that agent. If an agent had any program within the same period of time, in some embodiments, the processor may move to the next agent, otherwise it may continue; (b) Represent the given agent's attributes as a vector (e.g., as described herein regarding the first agent, Agent_ID), with the exception of the supervisor attributes. For each supervisor attribute, the processor may specify 1 if it is equal to the first agent's value and 0 otherwise; (c) Compute the Euclidean distance (or other means of comparison) between the vector of the first agent's (Agent_ID) attributes and the vector of the given agent's attributes. If a distance is below a predefined threshold or otherwise within a predefined range, indicating an acceptable level of similarity between the first agent and the given agent, the processor may add this agent to the control group of agents. For example, a distance of 1.2 means the two vectors are more similar than a distance of 12.3.

In some embodiments, at step 215, the processor may calculate an average rate of change in the first KPI for the control group of agents during the period of time. The processor may receive or retrieve the vectors of each agent in the control group (vector<agent_ID>), as well as the Program_ID and KPI_ID. In some embodiments, the processor may then compute the KPI_change, for each agent in the control group of agents (e.g., as described in step 205 regarding the first agent, Agent_ID). Once the KPI_change has been calculated for each agent in the control group, the processor may compute the average KPI_change for the control group of agents (e.g., calculating the mean, median, mode, etc.). In some embodiments, the output may be represented as KPI_change: float (for the control group).

In some embodiments, at step 220, the processor may calculate a first coaching impact of the first coaching program on the first Key Performance Indicator for the first agent relative to the average rate of change in the first Key Performance Indicator for the control group of agents during the period of time. In some embodiments, the processor may receive or retrieve as an input the KPI_change of first agent (Agent_ID) and of the control group of agents. In some embodiments, the Program_ID may be retrieved as well, e.g., for program identification purposes. In some embodiments, the processor may then perform one or more of the following: (a) Calculate the time invested in the program (time_invested=end_time−start_time, or, if there are multiple periods of time, then the aggregate of those times); and (b) Compute the first coaching impact, e.g., by subtracting the control group KPI change from the first agent's KPI change:

$$\text{Coaching Impact} = \text{KPIChange}_{agent} - \text{KPIChange}_{control}$$

Of course, in various embodiments, other calculations comparing the rate of change of the first agent's KPI relative to the average rate of change in the KPI of the control group of agents may be made to determine a coaching impact.

In some embodiments, at step 225, the processor may calculate a coaching effectiveness score. As understood herein, a coaching effectiveness score reflects the first coaching impact (e.g., as calculated in step 220) of the first coaching program compared to the period of time. In some embodiment, the processor may compute the coaching effectiveness by dividing the coaching impact (e.g., as calculated in step 220) by the time invested (e.g., regulated to standard units such as hours):

$$\text{Coaching Effectiveness} = \frac{\text{Coaching Impact}}{\text{Time invested}}$$

Accordingly, the calculation of the Coaching Effectiveness, in some embodiments, represents the delta of the KPI (end−beginning) divided by the total time (e.g., in hours) invested in the program. For example, if the coaching impact is 2.5, over the time invested of 2 hours, the couching effectiveness=2.5/2=1.25, meaning a KPI of 1.25 per hour invested.

In some embodiments, at step 230, the processor may identify a set of boosting factors which fit a learning curve with respect to a rate of change of a given agent's first KPI during the period of time. In some embodiments, the processor may fit a learning curve that models the relationship between an agent's KPI score and his potential KPI_change, in order to identify sections to boost (e.g., boosting sections), as further explained with reference to FIG. 3.

Figure 3:
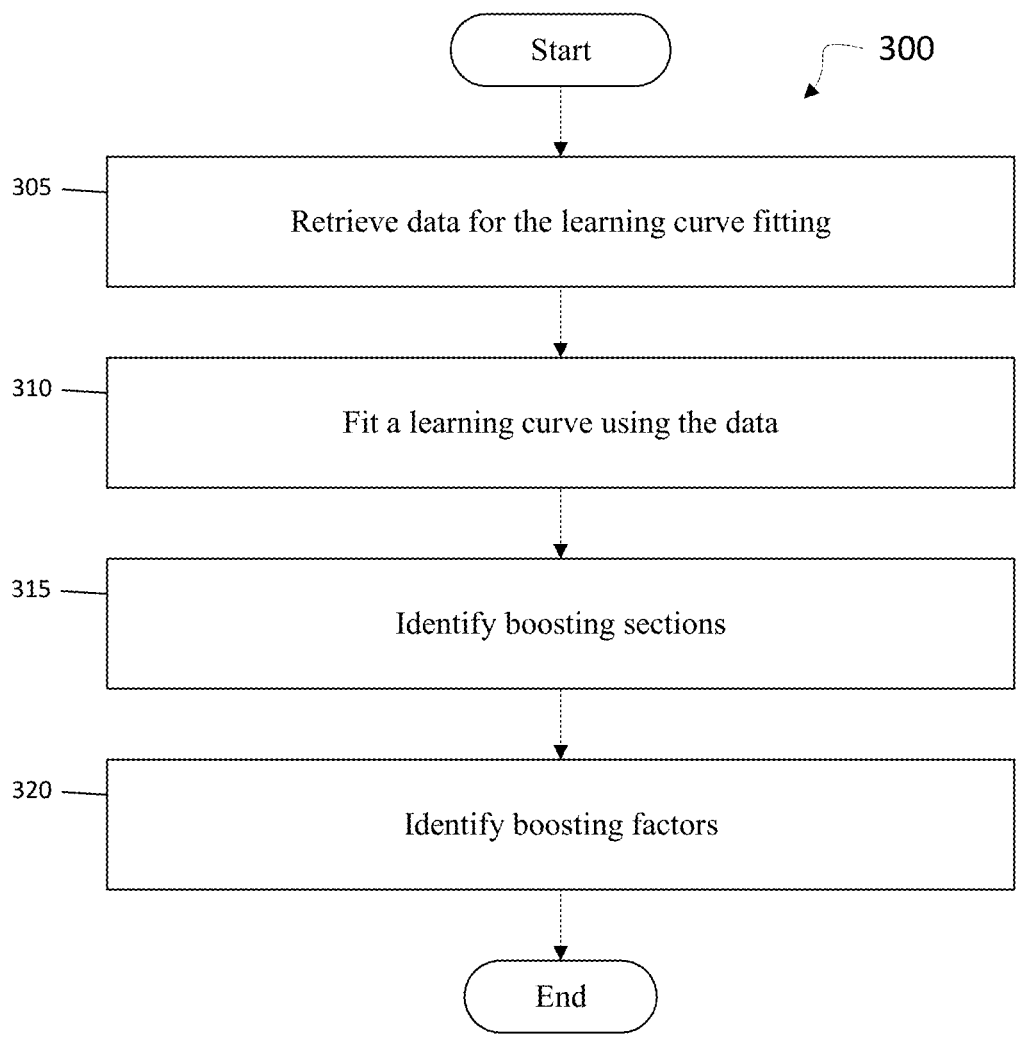
FIG. 3, is a flowchart of a method of identifying a set of boosting factors which fit a learning curve with respect to a rate of change of a given agent's KPI, according to embodiments of the invention.

Turning briefly to FIG. 3, in order to identify the learning curve parameters, as well as the boosting factors, in some embodiments, the processor may perform one or more of the following steps of method 300, starting at step 305, when the processor may retrieve the data for the learning curve fitting, e.g., as follows: For each program in the 'coaching program' table (e.g., TABLE 1—Coaching Programs Data, described herein) stored in performance management database 134: (a) Extract agent_ID, start_time and end_time; (b) Extract agent_ID, KPI_start (as discussed in step 205); (c) Compute agent_ID KPI_change (e.g., as described in step 205); and (d) Add a pair (KPI_start, KPI_change) to a vector.

At step 310, in some embodiments, the processor may fit a learning curve using the data from step 305, i.e., using the vectors (KPI_start, KPI_change) created from each data set. In some embodiments, the learning curve may, for example, have a form of a power-law curve, e.g., f(KPI_change)= aKPI$^b$. Fitting a power-law curve may be implemented by the processor using any of a number of available tools such as, for example, python, R, Matlab and etc., as understood by those skilled in the relevant art. For example, one possible solution via linearization and regression (X=KPI_start, Y=KPI_change) is as follows:

$$Y = aX^b \quad [1]$$

$$\ln(Y) = \ln(aX^b) \quad [2]$$

$$\ln(Y) = \ln(a) + \ln(X^b) \quad [3]$$

$$\ln(Y) = \ln(a) + b*\ln(X) \quad [4]$$

Assuming: Z=ln(Y), Q=ln(X), c=ln(a)

$$Z = c + bQ \quad [5]$$

Then, equation [5] may be fit by the processor, e.g., using linear regression.

To find the original parameters:

$$a = e^c; b = b \quad [6]$$

At step 315, in some embodiments, the processor may identify one or more boosting sections of the learning curve to be boosted with boosting factors, as described herein. The boosting factors are used to compute program effectiveness as described herein. In some embodiments, a performance learning curve may be divided into 3 primary stages: linear (steep acceleration), knee, and plateau. Effectiveness in the plateau area is inherently lower and so should be rewarded accordingly. Embodiments of the invention therefore boost Effectiveness according to its position on the curve.

Figure 4:
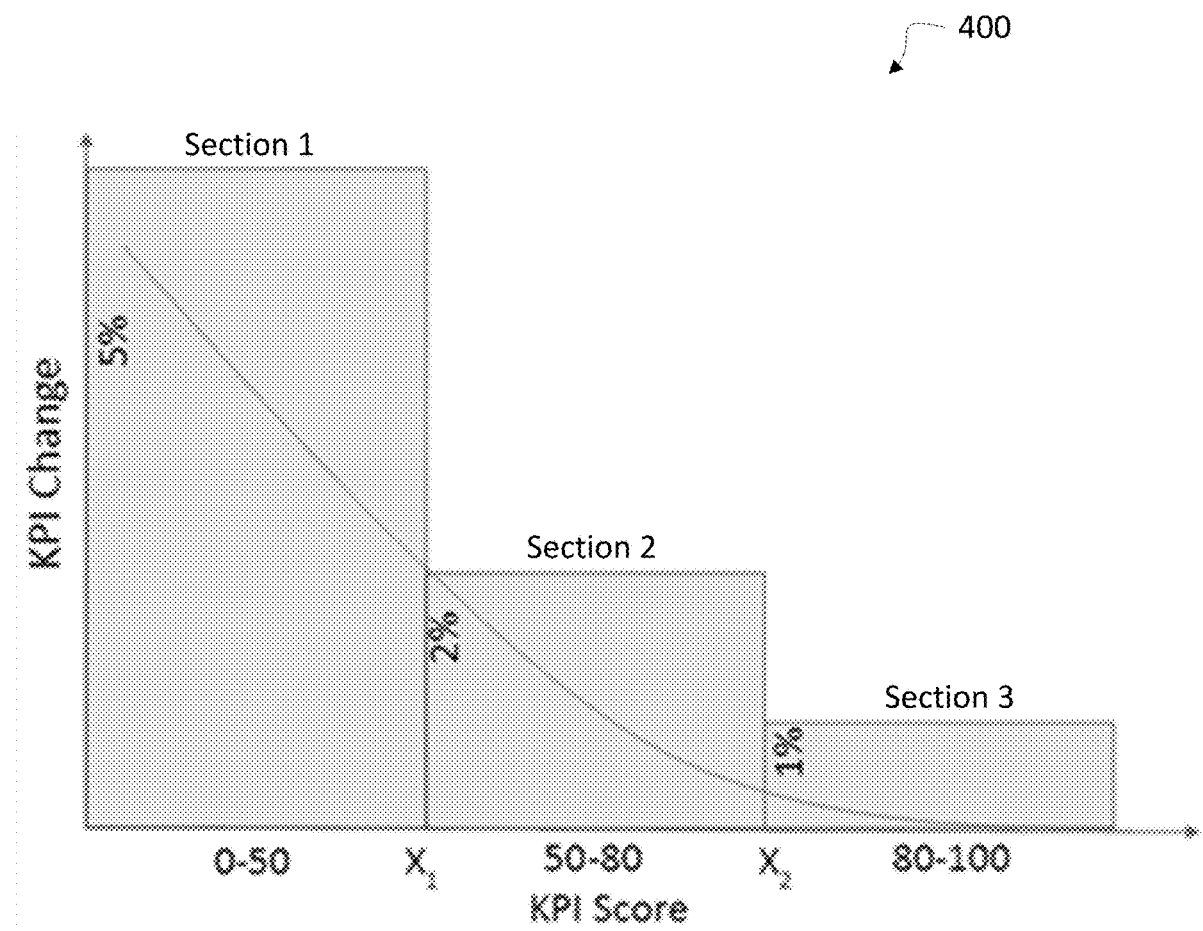
FIG. 4 depicts an example learning curve with boosting sections, shown according to embodiments of the invention.

In some embodiments, there may be, e.g., three boosting sections defined by the percentage of the area under the learning curve. For example, in some embodiments, by default, section 1 may cover 0% to 50%, section 2 may cover from 50% to 80%, and section three may cover from 80% to 100%. An example learning curve 400 with boosting sections is shown in FIG. 4. Of course, other parameters may be defined, e.g., by the user.

In order to compute the boosting factors (see step 320 herein), in some embodiments the processor may first identify values of X1 and X2 (e.g., KPI scores) that separate between the sections (see FIG. 4). In order to find X1 (which in this example separates sections 1 and 2), in some embodiments, the processor may solve the following equations:

$$\frac{\int_0^{x1} ax^b}{\int_0^1 ax^b} = 0.5 \quad [7]$$

$$x1 = \sqrt[b+1]{0.5} \quad [8]$$

Likewise, in some embodiments, in order to find X2 (which in this example separates sections 2 and 3), the processor may solve the following equations:

$$\frac{\int_0^{x2} ax^b}{\int_0^1 ax^b} = 0.8 \quad [9]$$

-continued $$x2 = \sqrt[b+1]{0.8} \quad [10]$$

At step 320, with X1 and X2 solved, in some embodiments, the processor may calculate the boosting factors, e.g., as follows: (a) Start with a vector of pairs constructed in step 305; (b) Sort the vector based on KPI_start, e.g., in ascending order; (c) For boosting factor 1, in some embodiments, the processor may compute the average KPI_Change for all points from KPI_start=0 to KPI_Start=X1:

$$KPI\_Change_1 = Average(X \cdot KPI_{Change}),$$
$$iff0 < KPI_{start} \le X1$$

In the example of FIG. 4, the average factor for section 1 is 5%.

(d) For boosting factor 2, in some embodiments, the processor may compute the average KPI_Change for all points from KPI_start=X1 to KPI_Start=X2:

$$KPI\_Change_2 = Average(X \cdot KPI_{Change}),$$
$$iffX1 < KPI_{start} \le X2$$

In the example of FIG. 4, the average factor for section 2 is 2%.

(e) For boosting factor 3, in some embodiments, the processor may compute the KPI_Change for all points from KPI_start=X2 to KPI_Start=1.

$$KPI\_Change_3 = Average(X \cdot KPI_{Change}),$$
$$iffX2 < KPI_{start} \le 1$$

In the example of FIG. 4, the average factor for section 3 is 1%.

(f) Accordingly, the boosting factor for section i is the change of that section with relation to section 3 (or the one with the least KPI_Change, e.g., at the end of the learning curve):

$$Boosting\_Factor_i = \frac{KPI\_Change_i}{KPI\_Change_3}$$

Returning to FIG. 2, in some embodiments, at step 235, the processor may boost the coaching effectiveness score (as calculated in step 225) based on a position of the agent on the learning curve. In some embodiments, the processor may receive the learning curve model (described in detail in step 230) and the KPI change information and boost each effectiveness score based on that model. To accomplish this, in some embodiments, the processor may receive as inputs the identified learning curve parameters, the coaching effectiveness score, and the Program_ID. In some embodiments the processor may then (1) extract KPI_start (e.g., as discussed in step 205), (2) provide or otherwise identify a model instance with a start term KPI score of the individual agent to receive the boosting factor, and (3) multiply the coaching effectiveness score by the corresponding boosting factor:

Boosted Coaching Effectiveness=Boosting_Factor*Coaching_Effectiveness

Finally, at step 240, in some embodiments, the processor may normalize the coaching effectiveness score (or the boosted coaching effectiveness score, in embodiments in which the coaching effectiveness score has been boosted, as in step 235). To normalize the coaching effectiveness score, in some embodiments the processor may map the score to a predefined function that maps the boosted effectiveness to a predefined scale, e.g., 0 to 100.

Figure 5:
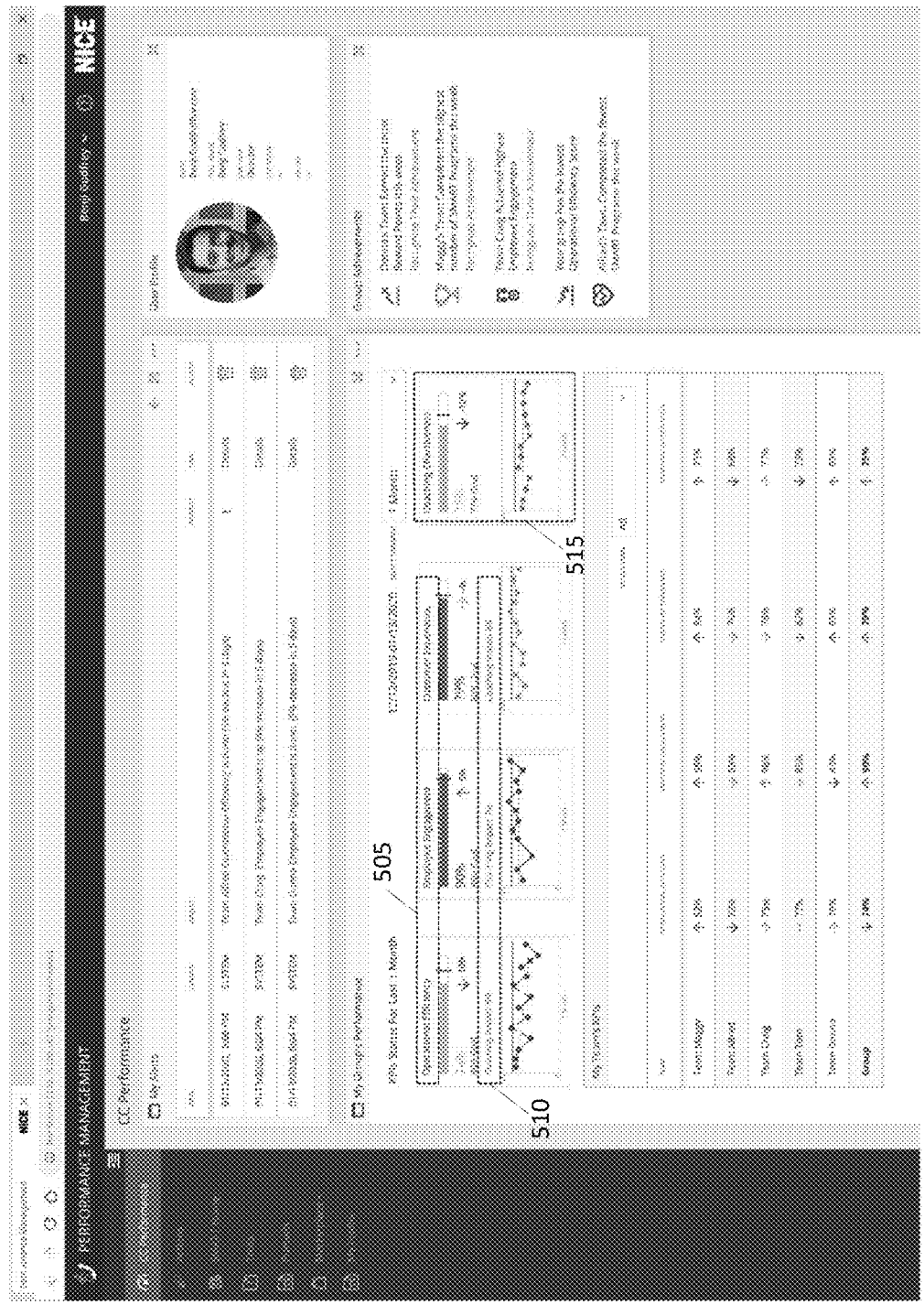
FIG. 5 depicts a first screenshot example, according to embodiments of the invention.

FIG. 5 is a representation of graphical user interface (GUI) displaying a home page 500 of a group manager, according to embodiments of the invention. The home page depicts a consolidated view of the 3 KPI (505) which the manager and his group are measured on: Operational Efficiency, Employee Engagement, Customer Experience. The impact of coaching per KPI (510) is displayed, as well as the Coaching Effectiveness (515) of the entire effectiveness of coaching in the organization.

Figure 6:
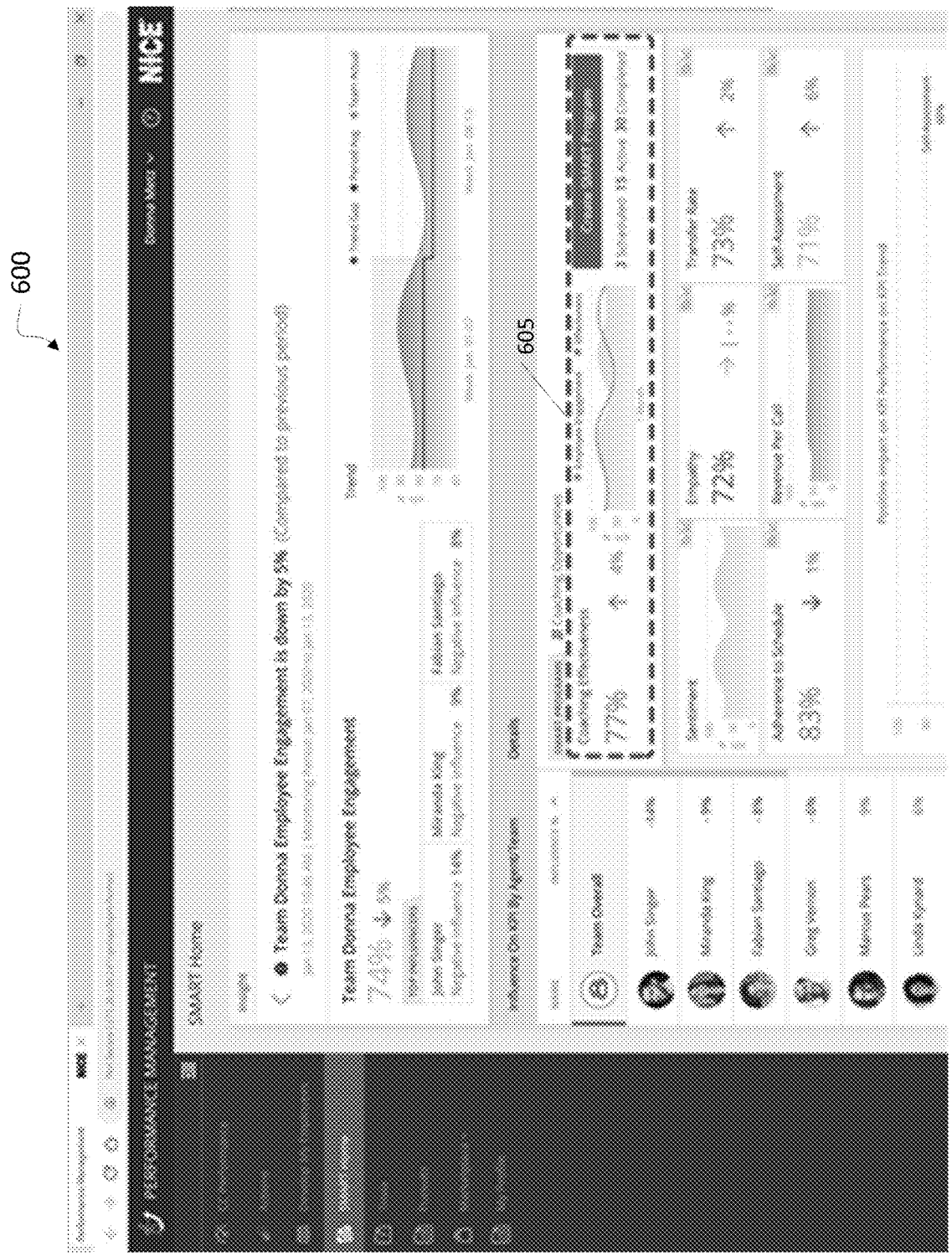
FIG. 6 depicts a second screenshot example, according to embodiments of the invention.

FIG. 6 is a representation of a GUI 600 displaying a detailed breakdown of the influence of a specific coaching program on a KPI for a particular group within an organization. The coaching effectiveness score and trend of coaching effectiveness for the group are indicated (605).

Based on the feedback provided, embodiments of the invention provide at least the following real-world practical applications and benefits: (a) the measuring of coaching effectiveness and impact across the organization so that managers will be able to quantify the return on investment (ROI) of coaching; (b) benchmarking coaching effectiveness standards so that team managers who provide coaching will be held accountable for the level of coaching they provide and will be coached if their effectiveness is too low. (e.g., if one falls below a defined threshold); (c) recommending behaviors to focus on per coaching program per agent based on previous coaching with the highest impact; and (d) standardizing effectiveness goals across the organizations.

FIG. 7 illustrates an example computing device according to an embodiment of the invention. Various components such as supervisor devices 110, agent devices 120, contact center 124 and other modules, may be or include computing device 700, or may include components such as shown in FIG. 7. For example, a first computing device 700 with a first processor 705 may be used to select a training program from a plurality of training programs for a selected worker.

Computing device 700 may include a processor 705 that may be, for example, a central processing unit processor (CPU), a chip or any suitable computing or computational device, an operating system 715, a memory 720, a storage 730, input devices 735 and output devices 740. Processor 705 may be or include one or more processors, etc., co-located or distributed. Computing device 700 may be for example a workstation or personal computer located at a workplace or call center, or may be at least partially implemented by a remote server (e.g., in the "cloud").

Operating system 715 may be or may include any code segment designed and/or configured to perform tasks involving coordination, scheduling, arbitration, supervising, controlling or otherwise managing operation of computing device 700, for example. Operating system 715 may be a commercial operating system. Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 720 may be or may include a plurality of, possibly different memory units.

Executable code 725 may be any executable code, e.g., an application, a program, a process, task or script. Executable code 725 may be executed by processor 705 possibly under control of operating system 715. For example, executable code 725 may be or include an application to select a training program for a worker. In some embodiments, more than one computing device 700 may be used. For example, a plurality of computing devices that include components similar to those included in computing device 700 may be connected to a network and used as a system.

Storage 730 may be or may include, for example, a hard disk drive, a floppy disk drive, a Compact Disk (CD) drive, a CD-Recordable (CD-R) drive, a universal serial bus (USB) device or other suitable removable and/or fixed storage unit. In some embodiments, some of the components shown in FIG. 7 may be omitted. For example, memory 720 may be a non-volatile memory having the storage capacity of storage 730. Accordingly, although shown as a separate component, storage 730 may be embedded or included in memory 720.

Input devices 735 may be or may include a mouse, a keyboard, a touch screen or pad or any suitable input device. It will be recognized that any suitable number of input devices may be operatively connected to computing device 700 as shown by block 735. Output devices 740 may include one or more displays, speakers and/or any other suitable output devices. It will be recognized that any suitable number of output devices may be operatively connected to computing device 700 as shown by block 740. Any applicable input/output (I/O) devices may be connected to computing device 700 as shown by blocks 735 and 740. For example, a wired or wireless network interface card (NIC), a modem, printer or facsimile machine, a universal serial bus (USB) device or external hard drive may be included in input devices 735 and/or output devices 740. Network interface 750 may enable device 700 to communicate with one or more other computers or networks. For example, network interface 750 may include a WiFi or Bluetooth device or connection, a connection to an intranet or the internet, an antenna etc.

Embodiments described in this disclosure may include the use of a special purpose or general-purpose computer including various computer hardware or software modules, as discussed in greater detail below.

Embodiments within the scope of this disclosure also include computer-readable media, or non-transitory computer storage medium, for carrying or having computer-executable instructions or data structures stored thereon. The instructions when executed may cause the processor to carry out embodiments of the invention. Such computer-readable media, or computer storage medium, can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computer" may be any computing system as previously defined herein, or any module or combination of modulates running on a computing system.

Computer database, systems integration, and scheduling technology may be improved by shortening the time taken to identify a person, retrieve records related to the person, and schedule a meeting with the person.

For the processes and/or methods disclosed, the functions performed in the processes and methods may be implemented in differing order as may be indicated by context. Furthermore, the outlined steps and operations are only provided as examples, and some of the steps and operations may be optional, combined into fewer steps and operations, or expanded into additional steps and operations.

The present disclosure is not to be limited in terms of the particular embodiments described in this application, which are intended as illustrations of various aspects. Many modifications and variations can be made without departing from its scope. Functionally equivalent methods and apparatuses within the scope of the disclosure, in addition to those enumerated, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used in this disclosure is for the purpose of describing particular embodiments only, and is not intended to be limiting.

This disclosure may sometimes illustrate different components contained within, or connected with, different other components. Such depicted architectures are merely exemplary, and many other architectures can be implemented which achieve the same or similar functionality.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

What is claimed is:

1. A method for measuring the effectiveness of an agent coaching program, the method comprising:
    retrieving, by a processor, from a performance management database, Key Performance Indicator data for a first agent;
    based on the retrieved data, calculating, by the processor, executing a recommender engine, a rate of change in a first Key Performance Indicator for the first agent in a first coaching program during a period of time;

selecting, by the processor, executing the recommender engine, a control group of agents, wherein agents in the control group of agents have not been exposed to the first coaching program;

calculating, by the processor, executing the recommender engine, an average rate of change in the first Key Performance Indicator for the control group of agents during the period of time;

calculating, by the processor, executing the recommender engine, a first coaching impact of the first coaching program on the first Key Performance Indicator for the first agent relative to the average rate of change in the first Key Performance Indicator for the control group of agents during the period of time;

calculating, by the processor, executing the recommender engine, a coaching effectiveness score, wherein the coaching effectiveness score reflects the first coaching impact of the first coaching program compared to the period of time;

identifying, by the processor, executing the recommender engine, a set of boosting factors, wherein the set of boosting factors fit a learning curve with respect to a rate of change of a given agent's first Key Performance Indicator during the period of time;

boosting, by the processor, executing the recommender engine, the coaching effectiveness score based on a position of the first agent on the learning curve; and selecting, by the processor, a coaching program from a plurality of coaching programs for a worker.

2. The method as in claim 1, further comprising normalizing the coaching effectiveness score.

3. The method as in claim 1, wherein calculating the first impact is calculated by subtracting the average rate of change in the first Key Performance Indicator for the control group of agents during the period of time from the rate of change in the first Key Performance Indicator for the first agent during the period of time.

4. The method as in claim 1, wherein the coaching effectiveness score is calculated by dividing the first coaching impact by the period of time.

5. The method as in claim 1, wherein boosting the coaching effectiveness score based on the position of the first agent on the learning curve further comprises: multiplying the coaching effectiveness score by a boosting factor of the set of boosting factors that is commensurate with the position of the first agent on the learning curve.

6. The method as in claim 1, wherein the period of time is the time invested in the first coaching program.

7. The method as in claim 1, wherein selecting a control group of agents comprises:

receiving attribute information for the first agent and for each agent in a pool of agents;

generating a respective vector representation for the first agent and for each agent in the pool of agents; and adding to the control group of agents each agent whose vector has a distance that is below a predefined threshold distance from the vector of the first agent.

8. A system for measuring the effectiveness of an agent coaching program, performed on a computer having a processor and memory, and one or more code sets stored in the memory and configured to execute in the processor, and which, when executed, configure the processor to:

retrieve, from a performance management database, Key Performance Indicator data for a first agent based on the retrieved data, calculate, executing a recommender engine, a rate of change in a first Key Performance Indicator for the first agent in a first coaching program during a period of time;

select, executing the recommender engine, a control group of agents, wherein agents in the control group of agents have not been exposed to the first coaching program;

calculate, executing the recommender engine, an average rate of change in the first Key Performance Indicator for the control group of agents during the period of time;

calculate, executing the recommender engine, a first coaching impact of the first coaching program on the first Key Performance Indicator for the first agent relative to the average rate of change in the first Key Performance Indicator for the control group of agents during the period of time;

calculate, executing the recommender engine, a coaching effectiveness score, wherein the coaching effectiveness score reflects the first coaching impact of the first coaching program compared to the period of time;

identify, executing the recommender engine, a set of boosting factors, wherein the set of boosting factors fit a learning curve with respect to a rate of change of a given agent's first Key Performance Indicator during the period of time;

boost, executing the recommender engine, the coaching effectiveness score based on a position of the first agent on the learning curve; and select a coaching program from a plurality of coaching programs for a worker.

9. The system as in claim 8, further comprising normalizing the coaching effectiveness score.

10. The system as in claim 8, wherein the processor is configured to calculate the first impact by subtracting the average rate of change in the first Key Performance Indicator for the control group of agents during the period of time from the rate of change in the first Key Performance Indicator for the first agent during the period of time.

11. The system as in claim 8, wherein the coaching effectiveness score is calculated by dividing the first coaching impact by the period of time.

12. The system as in claim 8, wherein the processor is configured to boost the coaching effectiveness score based on the position of the first agent on the learning curve by multiplying the coaching effectiveness score by a boosting factor of the set of boosting factors that is commensurate with the position of the first agent on the learning curve.

13. The system as in claim 8, wherein the period of time is the time invested in the first coaching program.

14. The system as in claim 8, wherein the processor is configured to:

receive attribute information for the first agent and for each agent in a pool of agents;

generate a vector representation for the first agent and for each agent in the pool of agents; and add to the control group of agents each agent whose vector has a distance that is below a predefined threshold distance from the vector of the first agent.

* * * * *